Oct. 16, 1928.
H. BERNIER
PRESS
Filed March 7, 1927
1,688,227
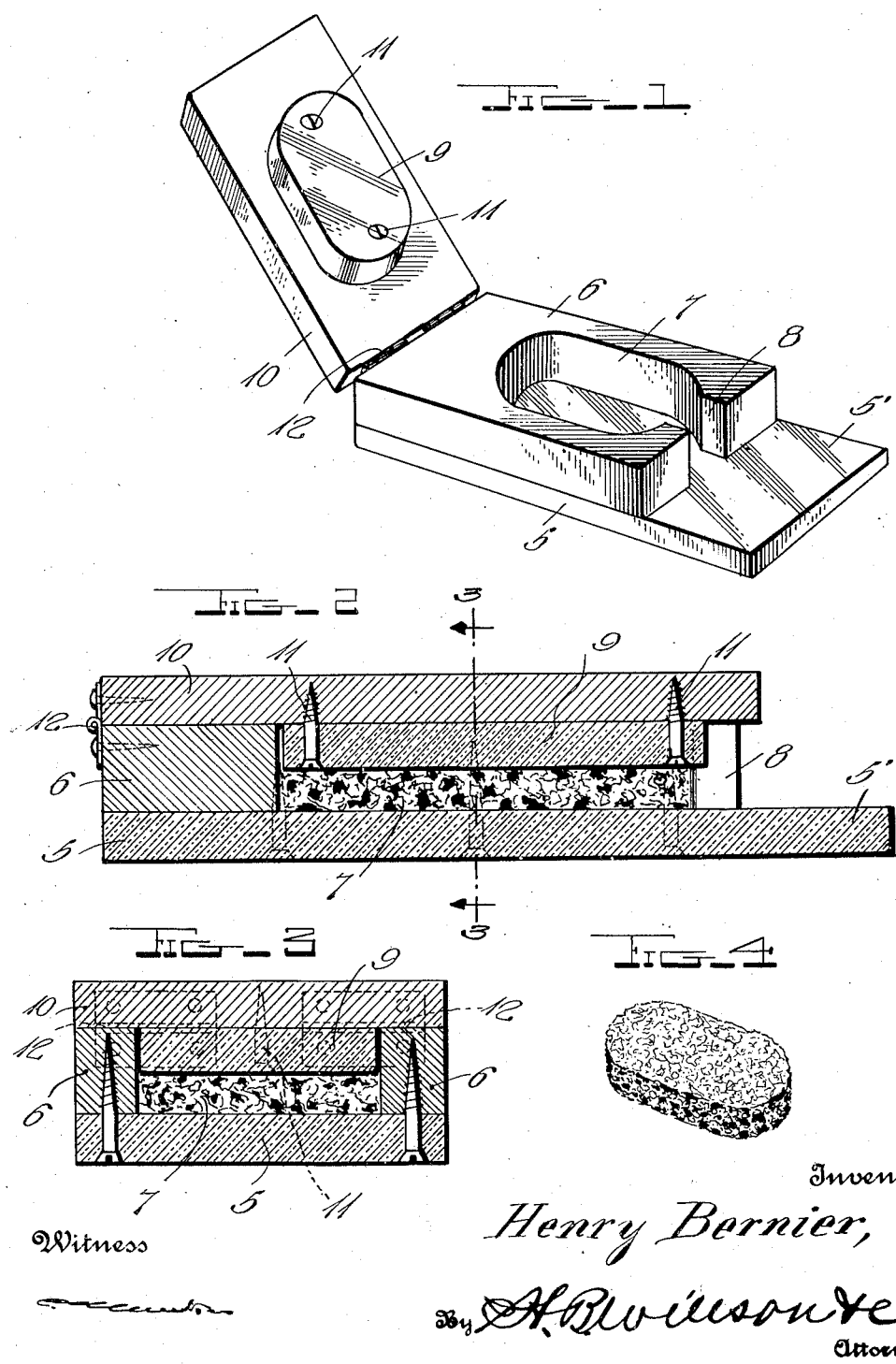
Inventor
Henry Bernier,
By H. B. Willson & Co.
Attorneys
Witness Patented Oct. 16, 1928.

1,688,227

UNITED STATES PATENT OFFICE.

HENRY BERNIER, OF EASTHAMPTON, MASSACHUSETTS.

PRESS.

Application filed March 7, 1927. Serial No. 173,574.

The present disclosure of the invention relates to a press which is designed primarily for compressing chopped or ground meat into cakes, but it is to be understood that the invention is not restricted to this particular field of use.

It is the object of the invention to provide a new and improved press of a type embodying a receptacle in which to place the material to be compressed, and a pressing member movable downwardly into said receptacle, the latter having a lateral opening from its interior to its exterior and from its upper side to its bottom, said opening permitting the surplus material to discharge as the pressing member is operated and later serving to admit a knife, spatula or the like, for the purpose of removing the compressed cake from the receptacle.

With the foregoing in view, the invention resides in the novel subject matter hereinafter described and claimed, the description being supplemented by the accompanying drawing.

Fig. 1 is a perspective view of a press constructed in accordance with my invention.

Fig. 2 is a central vertical longitudinal sectional view.

Fig. 3 is a vertical transverse section on line 3—3 of Fig. 2.

Fig. 4 is a perspective view showing one of the cakes formed by the press.

The specific embodiment of the invention herein illustrated, will be described, with the understanding that within the scope of the invention as claimed, numerous variations may be made.

The numeral 5 designates a horizontal base plate which may be constructed from any desired material, glass or the like being well adaptable for this purpose. Resting upon the base plate 5 in spaced relation with one end of the latter, is a rectangular block 6 formed of wood or any other desired material, said block having a recess 7 of desired shape from its upper to its lower side, so that the recessed block and the base plate 5, co-operate in forming a receptacle in which to place the material to be compressed into cake form.

The end of the block 6 which is spaced inwardly from one end of the base plate 5, is formed with an opening 8 extending from the bottom to the top of the block and from said end thereof to the recess 7. This opening permits excess material to escape from the recess 7 during the operation of the press and it will be seen that such material will be received upon the end portion 5' of the base plate 5, which is not covered by the block 6. The opening 8 also permits the use of a knife or the like to cut the surplus material from the cake formed in the recess 7. Moreover, it permits a knife, spatula or the like, to be slid inwardly beneath the cake, allowing the latter to be readily lifted out of the recess 7.

A pressing member 9 has been shown, receivable in the upper portion of the recess 7, and while this pressing member could be mounted and operated in any of numerous ways, I have shown it secured to a carrying member 10, by screws 11, said carrying member being hinged at 12 to one end of the block 6. Any desired materials may be employed in the construction of the members 9 and 10. Glass or the like is appropriate for the member 9, and member 10 may well be formed from wood.

In operating the device, the recess 7 is substantially filled with the material to be compressed and the members 9 and 10 are then jointly swung inwardly and downwardly and depressed with force. During this depression, the member 9 forms the mass of material into a cake, any excess material then discharging through the opening 8 onto the receiving platform formed by the end portion 5' of the base plate 5. When the compressing operation is complete, the members 9 and 10 are swung aside as shown in Fig. 1, a knife is inserted in the opening 8 to sever the surplus material from the cake, and this knife or other suitable device, is then horizontally inserted through the opening 8, under the complete cake, to permit easy removal of the latter from the recess 7.

It is to be noted that the opening 8 extends vertically throughout the height of the side walls of the mold so that an ordinary knife or spatula may be inserted therein, and the excess portion of the plastic mass itself may pass freely through such opening or slot when the plunger is depressed.

As excellent results may be obtained from the details disclosed, they may be followed if desired. However, within the scope of the invention as claimed, numerous variations may be made, as above set forth.

I claim:

1. A press comprising an open topped receptacle to receive the material to be compressed, said receptacle having a lateral passage which extends horizontally from the interior to the exterior of said receptacle and also extends vertically from the bottom through the upper side of said receptacle, and a movable pressing member downwardly insertible into the upper end of said receptacle, said passage permitting discharge of excess material as the pressing member is operated and also facilitating the use of a blade to sever the excess material from the cake formed in the receptacle as well as permitting horizontal insertion of the blade under the cake to remove the latter from the receptacle.

2. A structure as specified in claim 1; together with a stationary horizontal platform connected with the receptacle and projecting therefrom in position to receive the excess material discharged through said opening.

3. A press comprising a stationary horizontal base plate, a substantially flat block rigidly secured upon said base plate in inwardly spaced relation with an edge of the latter, said block having a recess from its upper to its lower side and being formed with an opening disposed toward the aforesaid edge of the base, said opening extending from said recess to the exterior of the block and from the top to the bottom of the latter, and a pressing member downwardly movable into the recess to compress material therein into a cake, the aforesaid opening permitting discharge of surplus material onto the outlying portion of the base plate, said opening also permitting use of a knife to sever the surplus material from the cake, and introduction of a knife under the cake for the purpose of removing it from the recess.

4. A structure as specified in claim 3; together with a carrying member to which said pressing member is connected, and means hinging said carrying member to said block, allowing the pressing member to be readily swung to or from operative position.

In testimony whereof I have hereunto affixed my signature.

HENRY BERNIER.